United States Patent
Watanabe et al.

(10) Patent No.: US 9,038,372 B2
(45) Date of Patent: *May 26, 2015

(54) EXHAUST PURIFICATION SYSTEM OF INTERNAL COMBUSTION ENGINE

(75) Inventors: Masao Watanabe, Susono (JP); Koutarou Hayashi, Mishima (JP); Kohei Yoshida, Gotemba (JP); Yuki Bisaiji, Mishima (JP); Kazuhiro Umemoto, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/264,062

(22) PCT Filed: Oct. 4, 2010

(86) PCT No.: PCT/JP2010/067707
§ 371 (c)(1),
(2), (4) Date: Oct. 12, 2011

(87) PCT Pub. No.: WO2012/046333
PCT Pub. Date: Apr. 12, 2012

(65) Prior Publication Data
US 2013/0183202 A1    Jul. 18, 2013

(51) Int. Cl.
*F01N 3/00* (2006.01)
*F01N 3/10* (2006.01)
(Continued)

(52) U.S. Cl.
CPC ........ *B01D 53/9422* (2013.01); *B01D 53/9418* (2013.01); *F01N 3/0814* (2013.01); *F01N 3/0842* (2013.01); *F01N 3/0871* (2013.01); *F02D 41/0275* (2013.01); *F02D 41/1408* (2013.01); *F02D 41/405* (2013.01);
(Continued)

(58) Field of Classification Search
None
See application file for complete search history.

(56) References Cited

U.S. PATENT DOCUMENTS 5,052,178 A    10/1991    Clerc et al.
5,057,483 A *  10/1991    Wan .............................. 502/304
(Continued)

FOREIGN PATENT DOCUMENTS

CN    101454081 A    6/2009
CN    101600860 A    12/2009
(Continued)

OTHER PUBLICATIONS

Yashima et al. JP-2010-012459A—Jan. 2010. Japan—machine translated to English.*

(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside an engine exhaust passage, a hydrocarbon feed valve (15) and an exhaust purification catalyst (13) are arranged. The carrier (50) of the exhaust purification catalyst (13) is formed from a crystallized composite oxide of aluminum and an alkali earth metal. On this carrier (50), precious metal catalysts (51, 52) are carried. The concentration of hydrocarbons which flow into the exhaust purification catalyst (13) is made to vibrate by within a predetermined range of amplitude of a 200 ppm or more and within a predetermined range of period of 5 second or less, whereby the $NO_x$ which is contained in exhaust gas is reduced at the exhaust purification catalyst (13).

7 Claims, 10 Drawing Sheets

(51) Int. Cl.

| | | |
|---|---|---|
| F01N 9/00 | (2006.01) | |
| B01D 53/94 | (2006.01) | |
| F01N 3/08 | (2006.01) | |
| F02D 41/02 | (2006.01) | |
| F02D 41/40 | (2006.01) | |
| F01N 13/00 | (2010.01) | |
| F02D 41/14 | (2006.01) | |

(52) U.S. Cl.
CPC ... *B01D2251/208* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2092* (2013.01); *F01N 2240/30* (2013.01); *F01N 2510/06* (2013.01); *F01N 2560/06* (2013.01); *F01N 2610/03* (2013.01); *Y02T 10/44* (2013.01); *Y02T 10/24* (2013.01); *F01N 13/009* (2014.06)

(56) References Cited

U.S. PATENT DOCUMENTS

| | | |
|---|---|---|
| 5,075,274 A | 12/1991 | Kiyohide et al. |
| 5,402,641 A | 4/1995 | Katoh et al. |
| 5,882,607 A | 3/1999 | Miyadera et al. |
| 6,109,024 A | 8/2000 | Kinugasa et al. |
| 6,327,851 B1 | 12/2001 | Bouchez et al. |
| 6,413,483 B1 | 7/2002 | Brisley et al. |
| 6,477,834 B1 | 11/2002 | Asanuma et al. |
| 6,667,018 B2 | 12/2003 | Noda et al. |
| 6,813,882 B2 | 11/2004 | Hepburn et al. |
| 6,854,264 B2 | 2/2005 | Elwart et al. |
| 6,877,311 B2 | 4/2005 | Uchida |
| 6,983,589 B2 | 1/2006 | Lewis et al. |
| 7,063,642 B1 | 6/2006 | Hu et al. |
| 7,073,325 B2 | 7/2006 | Nakatani et al. |
| 7,082,753 B2 | 8/2006 | Dalla Betta et al. |
| 7,111,456 B2 | 9/2006 | Yoshida et al. |
| 7,137,379 B2 | 11/2006 | Sasaki et al. |
| 7,146,800 B2 | 12/2006 | Toshioka et al. |
| 7,165,393 B2 | 1/2007 | Betta et al. |
| 7,299,625 B2 | 11/2007 | Uchida et al. |
| 7,332,135 B2 | 2/2008 | Gandhi et al. |
| 7,412,823 B2 | 8/2008 | Reuter et al. |
| 7,454,900 B2 | 11/2008 | Hayashi |
| 7,484,504 B2 | 2/2009 | Kato et al. |
| 7,506,502 B2 | 3/2009 | Nakano et al. |
| 7,549,284 B2 | 6/2009 | Iihoshi et al. |
| 7,703,275 B2 | 4/2010 | Asanuma et al. |
| 7,707,821 B1 | 5/2010 | Legare |
| 7,861,516 B2 | 1/2011 | Allansson et al. |
| 8,099,950 B2 | 1/2012 | Kojima et al. |
| 8,215,101 B2 | 7/2012 | Tsujimoto et al. |
| 8,261,532 B2 | 9/2012 | Fukuda et al. |
| 8,281,569 B2 | 10/2012 | Handa et al. |
| 8,434,296 B2 | 5/2013 | Wada et al. |
| 8,572,950 B2 | 11/2013 | Bisaiji et al. |
| 8,656,706 B2 | 2/2014 | Umemoto et al. |
| 8,671,667 B2 | 3/2014 | Bisaiji et al. |
| 8,679,410 B2 | 3/2014 | Umemoto et al. |
| 8,689,543 B2 | 4/2014 | Numata et al. |
| 8,695,325 B2 | 4/2014 | Bisaiji et al. |
| 2001/0052232 A1 | 12/2001 | Hoffmann et al. |
| 2002/0029564 A1 | 3/2002 | Roth et al. |
| 2003/0010020 A1 | 1/2003 | Taga et al. |
| 2003/0040432 A1 | 2/2003 | Beall et al. |
| 2003/0101713 A1 | 6/2003 | Betta et al. |
| 2004/0045285 A1 | 3/2004 | Penetrante et al. |
| 2004/0050037 A1 | 3/2004 | Betta et al. |
| 2004/0055285 A1 | 3/2004 | Rohr et al. |
| 2004/0154288 A1 | 8/2004 | Okada et al. |
| 2004/0175305 A1 | 9/2004 | Nakanishi et al. |
| 2004/0187477 A1 | 9/2004 | Okugawa et al. |
| 2005/0135977 A1 | 6/2005 | Park et al. |
| 2005/0147541 A1 | 7/2005 | Ajisaka et al. |
| 2006/0053778 A1 | 3/2006 | Asanuma et al. |
| 2006/0107657 A1 | 5/2006 | Bernler et al. |
| 2006/0153761 A1 | 7/2006 | Bandl-Konrad et al. |
| 2006/0286012 A1 | 12/2006 | Socha et al. |
| 2007/0016357 A1 | 1/2007 | Nakagawa et al. |
| 2007/0028601 A1 | 2/2007 | Duvinage et al. |
| 2007/0059223 A1 | 3/2007 | Golunski et al. |
| 2007/0089403 A1 | 4/2007 | Pfeifer et al. |
| 2007/0125073 A1 | 6/2007 | Reuter et al. |
| 2007/0151232 A1 | 7/2007 | Dalla Betta et al. |
| 2008/0022662 A1 | 1/2008 | Yan |
| 2008/0053073 A1 | 3/2008 | Kalyanaraman et al. |
| 2008/0102010 A1 | 5/2008 | Bruck et al. |
| 2008/0120963 A1 | 5/2008 | Morita et al. |
| 2008/0148711 A1 | 6/2008 | Takubo |
| 2008/0154476 A1 | 6/2008 | Takubo |
| 2008/0196398 A1 | 8/2008 | Yan |
| 2008/0223020 A1 | 9/2008 | Yoshida et al. |
| 2008/0276602 A1 | 11/2008 | McCabe et al. |
| 2009/0000277 A1 | 1/2009 | Yoshida et al. |
| 2009/0049824 A1 | 2/2009 | Kojima et al. |
| 2009/0049825 A1 | 2/2009 | Ohashi |
| 2009/0049826 A1 | 2/2009 | Toshioka et al. |
| 2009/0077948 A1 | 3/2009 | Mondori et al. |
| 2009/0084091 A1 | 4/2009 | Tsujimoto et al. |
| 2009/0118121 A1 | 5/2009 | Sarai |
| 2009/0120072 A1 | 5/2009 | Dalla Betta et al. |
| 2009/0151332 A1 | 6/2009 | Toshioka et al. |
| 2009/0191108 A1 | 7/2009 | Blanchard et al. |
| 2009/0196811 A1 | 8/2009 | Yamashita et al. |
| 2009/0229251 A1 | 9/2009 | Kadowaki |
| 2009/0249768 A1 | 10/2009 | Asanuma et al. |
| 2009/0266057 A1 | 10/2009 | Tsujimoto et al. |
| 2009/0282809 A1 | 11/2009 | Toshioka |
| 2009/0288393 A1 | 11/2009 | Matsuno et al. |
| 2009/0313970 A1 | 12/2009 | Iida |
| 2010/0005873 A1 | 1/2010 | Katoh et al. |
| 2010/0055012 A1 | 3/2010 | Grisstede et al. |
| 2010/0107613 A1 | 5/2010 | Masuda et al. |
| 2010/0115923 A1 | 5/2010 | Tsujimoto et al. |
| 2010/0126148 A1 | 5/2010 | Morishima et al. |
| 2010/0132356 A1 | 6/2010 | Lee |
| 2010/0154387 A1 | 6/2010 | Shibata et al. |
| 2010/0233051 A1 | 9/2010 | Grisstede et al. |
| 2010/0236224 A1 | 9/2010 | Kumar et al. |
| 2010/0242459 A1 | 9/2010 | Tsujimoto et al. |
| 2011/0041486 A1 | 2/2011 | Kato et al. |
| 2011/0047984 A1 | 3/2011 | Lee et al. |
| 2011/0047988 A1 | 3/2011 | Lewis et al. |
| 2011/0113754 A1 | 5/2011 | Kohara et al. |
| 2011/0120100 A1 | 5/2011 | Yin et al. |
| 2011/0131952 A1 | 6/2011 | Onodera et al. |
| 2011/0173950 A1 | 7/2011 | Wan et al. |
| 2011/0209459 A1 | 9/2011 | Hancu et al. |
| 2012/0122660 A1 | 5/2012 | Andersen et al. |
| 2012/0124967 A1 | 5/2012 | Yang et al. |
| 2012/0124971 A1 | 5/2012 | Bisaiji et al. |
| 2012/0131908 A1 | 5/2012 | Bisaiji et al. |
| 2013/0000284 A1 | 1/2013 | Bisaiji et al. |
| 2013/0011302 A1 | 1/2013 | Bisaiji et al. |
| 2013/0022512 A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |

(56) References Cited

FOREIGN PATENT DOCUMENTS

| | | |
|---|---|---|
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | 2010012459 A * | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

International Search Report issued in International Application No. PCT/JP2010/067707 on Jan. 18, 2011.
Oct. 26, 2010 International Search Report issued in International Patent Application No. PCT/JP2010/063135.
Jan. 18, 2011 International Search Report issued in International Patent Application No. PCT/JP2010/068785.
Dec. 21, 2010 Search Report issued in International Patent Application No. PCT/JP2010/065449 (with translation).
Jan. 18, 2011 International Search Report issued in International Patent Application No. PCT/JP2010/067705.
U.S. Appl. No. 13/257,789 in the name of Nishioka et al., filed Oct. 14, 2011.
U.S. Appl. No. 13/263,272 in the name of Bisaui et al., filed Oct. 6, 2011.
U.S. Appl. No. 13/259,885 in the name of Umemoto et al., filed Sep. 23, 2011.
U.S. Appl. No. 13/260,986 in the name of Watanabe et al. on Sep. 29, 2011.
Office Action dated Oct. 23, 2013 issued in U.S. Appl. No. 13/263,272.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 27, 2011 International Search Report issued in International Patent Application No. PCT/JP2011/075618.
Jun. 15, 2010 International Search Report issued in International Patent Application No. PCT/JP2010/054730(with translation).
Nov. 22, 2010 International Search Report issued in International Patent Application No. PCT/JP2010/065186 (with translation).
Jul. 14, 2014 Office Action issued in U.S. Appl. No. 13/262,001.
Jul. 14, 2014 Office Action issued in U.S. Appl. No, 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with English translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303.
Mar. 15, 2011 International Search Report issued in International Patent Application No. PCT/JP2011/053429.
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264, (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2012 Office Action issued in U.S. Appl. No. 13/202,692.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/258,483 in the name of Numata et al., filed Sep. 22, 2011.

(56) References Cited

OTHER PUBLICATIONS

U.S. Appl. No. 13/259,574 in the name of Tsukamoto et al., filed Sep. 23, 2011.
U.S. Appl. No. 13/262,858 in the name of Bisaji et al., filed Oct. 4, 2011.
U.S. Appl. No. 13/263,660 in the name of Umemoto et al., filed Oct. 7, 2011.
U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/58,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Appl. No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618, (with translation).
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
May 8, 2014 Office Action issued in U.S. Appl. No. 13/375,674.
Office Action dated Apr. 23, 2014 issued in U.S. Appl. No. 13/260,986.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733,.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, a carrier of the exhaust purification catalyst is formed from a crystallized composite oxide of aluminum and an alkali earth metal and a precious metal catalyst is carried on the carrier, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, the concentration of hydrocarbons flowing into the exhaust purification catalyst is made to vibrate within the predetermined range of amplitude and within the predetermined range of period to thereby reduce $NO_x$ which is contained in the exhaust gas in the exhaust purification catalyst.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
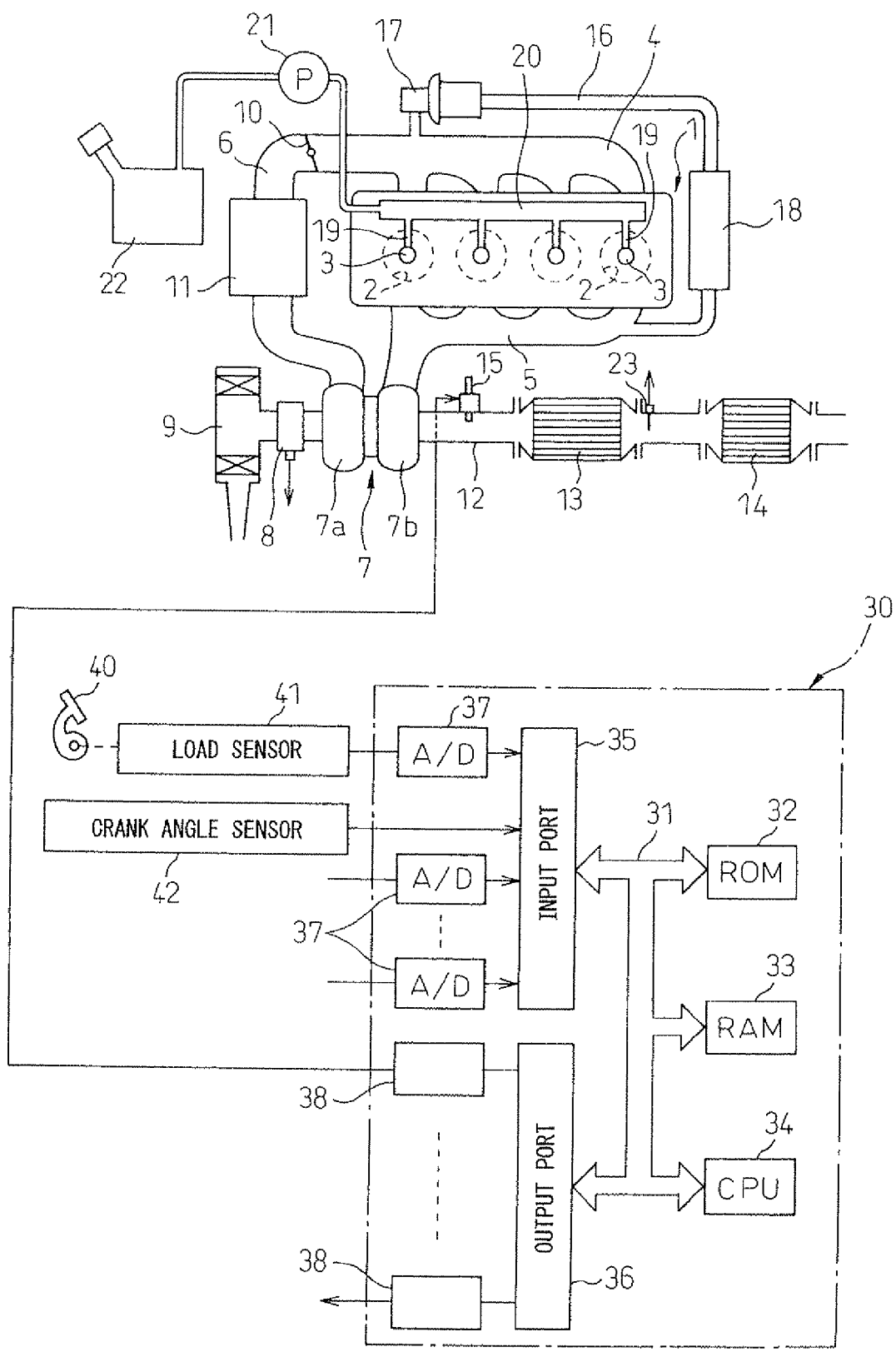
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7$b$ of the exhaust turbocharger 7. The outlet of the exhaust turbine 7$b$ is connected through an exhaust pipe 12 to an inlet of the exhaust purification catalyst 13, while an outlet of the exhaust purification catalyst 13 is connected to a particulate filter 14 for trapping particulate which is contained in exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting an exhaust gas temperature is attached. The output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
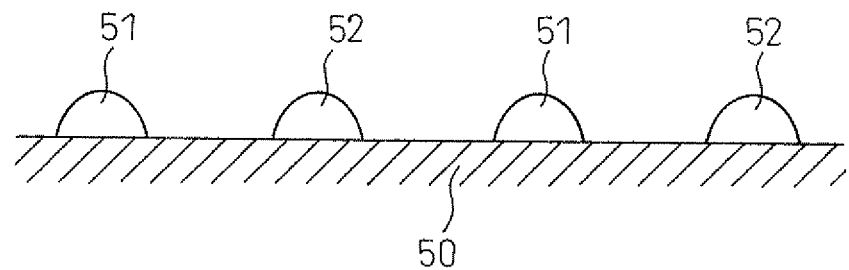
FIG. 2 is a view schematically showing a surface part of a catalyst carrier.

FIG. 2 schematically shows a surface part of a catalyst carrier which is carried on a substrate of the exhaust purification catalyst 13. The carrier of this exhaust purification catalyst 13 is formed from a crystallized composite oxide of aluminum and an alkali earth metal. As shown in FIG. 2, precious metal catalysts 51 and 52 are carried on this catalyst carrier 50. In FIG. 2, the precious metal catalyst 51 is comprised of platinum Pt, while the precious metal catalyst 52 is comprised of rhodium Rh. Note that, the catalyst carrier 50 can further carry palladium Pd in addition to the platinum Pt 51 and rhodium Rh 52.

On the other hand, as explained above, the composite oxide is comprised of a crystallized composite oxide of aluminum and an alkali earth metal. In this case, as the alkali earth metal, barium Ba or magnesium Mg may be used. In the embodiment shown in FIG. 2, as the alkali earth metal, barium B is used. The composite oxide forming the catalyst carrier 50 is comprised of barium aluminate $BaAl_2O_4$.

Figure 17:
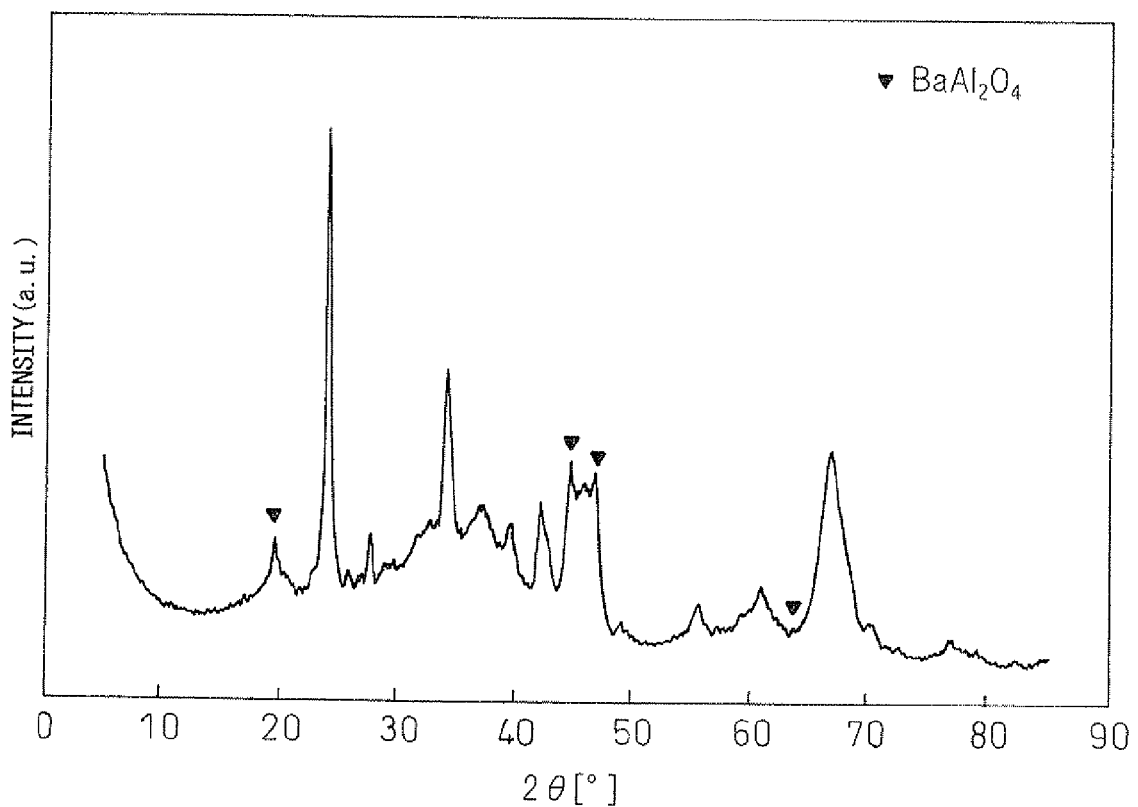
FIG. 17 is a view showing results of analysis by an X-ray diffractometer.

Explaining one example of the method of preparation of the catalyst carrier 50 shown in FIG. 2, alumina 100 g/liter is impregnated with barium acetate of 0.1 mol/liter, then is fired at 800° C. for 5 hours to thereby prepare barium aluminate $BaAl_2O_4$ in which the barium is crystallized. This barium aluminate $BaAl_2O_4$ is made the catalyst carrier 50. On this catalyst carrier 50, for example, 2 g of platinum Pt and 1 g of rhodium Rh are carried. Note that, this barium aluminate $BaAl_2O_4$ is analyzed by an X-ray diffractometer. As will be understood from the results of analysis shown in FIG. 17, it is confirmed that, in this barium aluminate $BaAl_2O_4$, the barium Ba is crystallized.

If the barium Ba is crystallized in this way, compared with the case where the barium Ba is simply contained in the catalyst carrier, the surface part of the catalyst carrier 50 becomes weaker in basicity. That is, by making the barium Ba crystallize, it is possible to weaken the basicity of the surface part of the catalyst carrier 50. Note that, even if the basicity is weakened in this way, the surface of the catalyst carrier 50 exhibits basicity, though weak.

Figure 3:
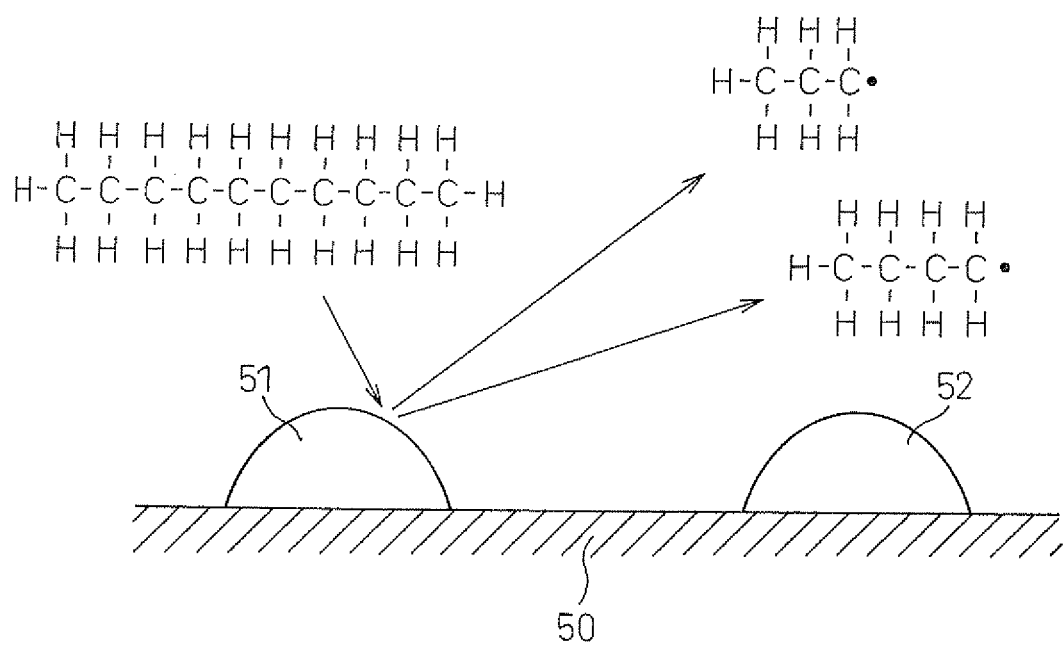
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HO which are injected from the hydrocarbon feed valve 15 become radical hydrocarbons HO with a small carbon number due to the platinum Pt 51.

Note that, even if the fuel injector 3 injects fuel, that is, hydrocarbons, into the combustion chamber 2 in the second half of the expansion stroke or exhaust stroke, the hydrocarbons are reformed in the combustion chamber 2 or exhaust purification catalyst 13, and the $NO_x$ which is contained in exhaust gas is removed by the reformed hydrocarbons in the exhaust purification catalyst 13. Therefore, in the present invention, instead of feeding hydrocarbons from the hydrocarbon feed valve 15 to the inside of an engine exhaust passage, it is also possible to feed hydrocarbons into the combustion chamber 2 in the second half of the expansion stroke or exhaust stroke. In this way, in the present invention, it is possible to feed hydrocarbons into the combustion chamber 2, but below, the present invention will be explained with reference to the case of trying to inject hydrocarbons from a hydrocarbon feed valve 15 to the inside of an engine exhaust passage.

Figure 4:
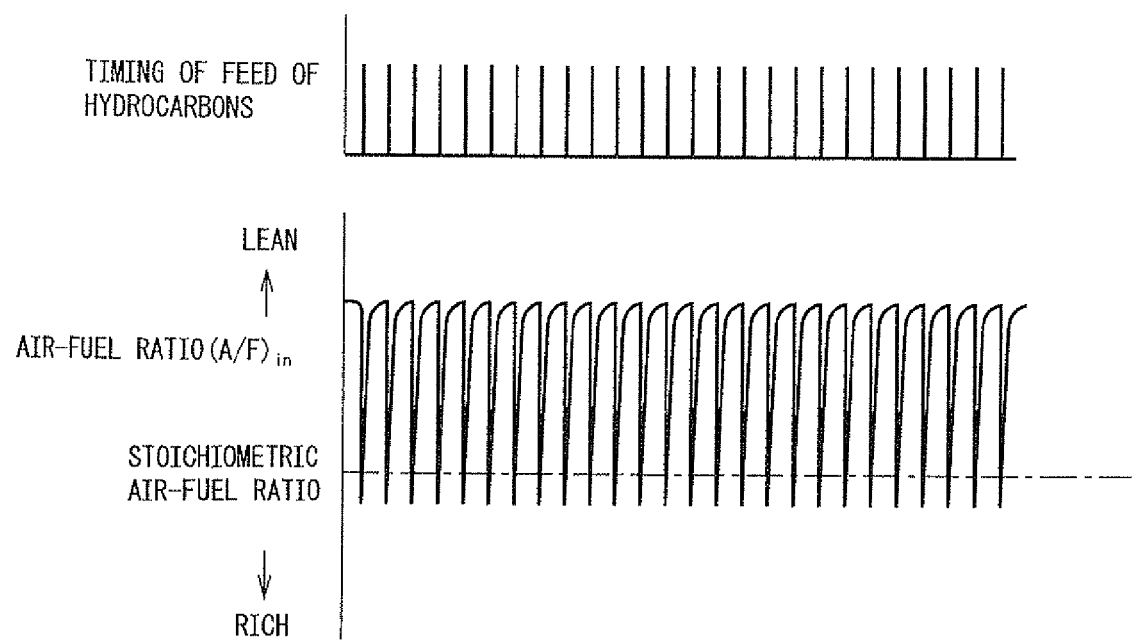
FIG. 4 is a view showing a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
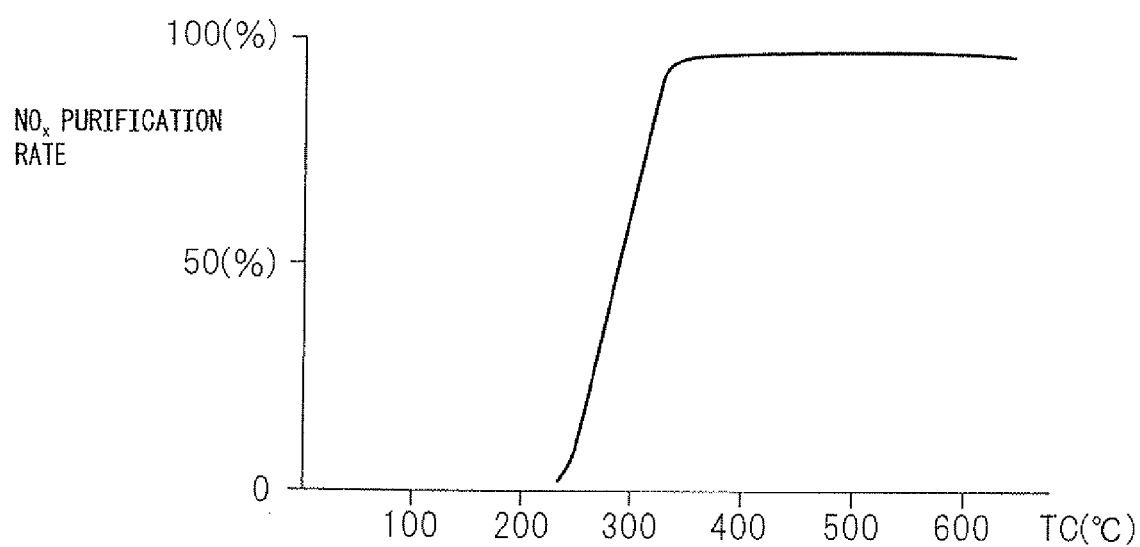
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
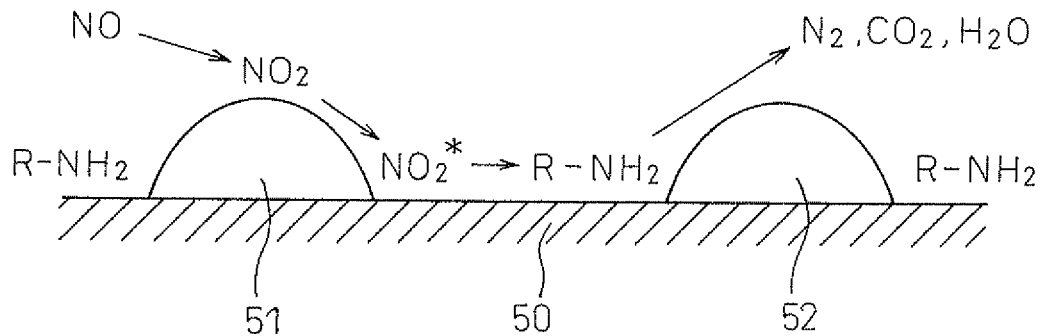
FIGS. 6A and 6B are views for explaining an oxidation reduction reaction in an exhaust purification catalyst.
Figure 6B:
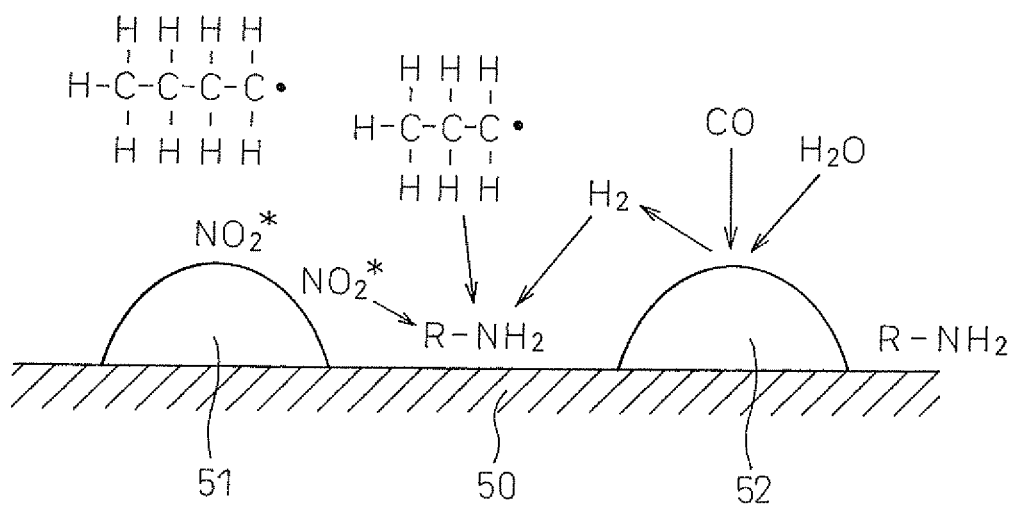

Furthermore, at this time, a large amount of reducing intermediate containing nitrogen and hydrocarbons continues to be held or adsorbed on the surface part of the catalyst carrier 50 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum Pt 51 and becomes $NO_2$. Next, this $NO_2$ is given electrons from the platinum Pt 51 and becomes $NO_2^-$. Therefore, on the platinum Pt 51, a large amount of $NO_2^-$ is produced. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. On the other hand, at this time, as shown in FIG. 6B, on the rhodium Rh 52, hydrogen $H_2$ is produced from the carbon monoxide CO and moisture $H_2O$ which are contained in the exhaust gas.

Figure 7:
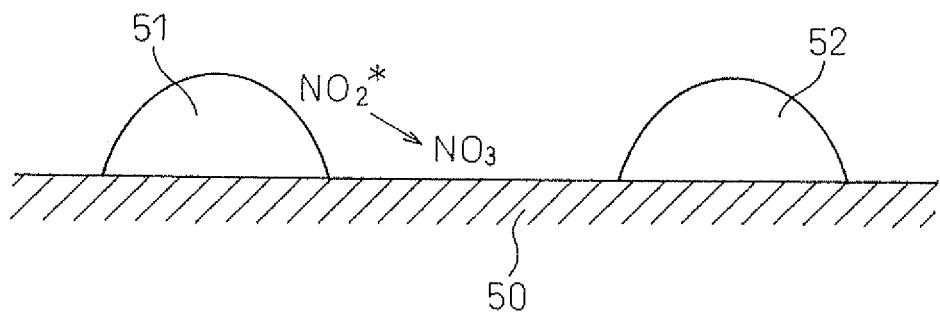
FIG. 7 is a view for explaining an oxidation reduction reaction in an exhaust purification catalyst.

In this regard, after the active $NO_2^*$ is produced, if the state of a high oxygen concentration around the active $NO_2^*$ continues for a predetermined time or more, the active $NO_2^*$ is oxidized and, as shown in FIG. 7, is absorbed or held at surface of the catalyst carrier 50 in the form of $NO_3$. That is, $NO_x$ is stored at the exhaust purification catalyst 13. However, the barium Ba in the catalyst carrier 50 is crystallized, so as explained before, the surface part of the catalyst carrier 50 is weak in basicity, therefore, the force holding the $NO_3$ on the surface of the catalyst carrier 50, that is, the force storing the $NO_x$ in the exhaust purification catalyst 13, is weak.

As opposed to this, if the hydrogen concentration around the active $NO_2^*$ is made higher before the above constant time elapses, as shown in FIG. 6B, the active $NO_2^*$ reacts on the platinum Pt 51 with the radical hydrocarbons HC and the hydrogen $H_2$ which is produced on rhodium Rh 52 whereby the reducing intermediate R—$NH_2$ is produced. This reducing intermediate R—$NH_2$ sticks or is adhered to the surface of the catalyst carrier 50.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—$NH_2$ to become $N_2$, $CO_2$, and $H_2O$, therefore the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, until the produced reducing intermediate reacts with the active $NO_2^*$, a sufficient amount of reducing intermediate R—$NH_2$ has to be held on the surface part of the catalyst carrier 50. For this reason, the catalyst carrier 50 is formed so that its surface part exhibits basicity.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is stored in the form of $NO_3$ inside the exhaust purification catalyst 13 without producing the reducing intermediate. To avoid this, it is necessary to make the concentration of hydrocarbons flowing into the exhaust purification catalyst 13 vibrate by within a predetermined range of period.

Therefore, in this embodiment according to the present invention, to make the $NO_x$ contained in exhaust gas and reformed hydrocarbons react to produce a reducing intermediate R—$NH_2$ containing nitrogen and hydrocarbons, precious metal catalysts 51 and 52 are carried on the catalyst carrier 50 of the exhaust purification catalyst 13, the catalyst carrier 50 is formed from a crystallized composite oxide of aluminum and an alkali earth metal to hold, the produced reducing intermediate R—NH$_2$ inside the exhaust purification catalyst 13, NO$_x$ is reduced by the reducing action of the reducing intermediate R—NH$_2$ held on the catalyst carrier 50, and the vibration period of the hydrocarbon concentration is made the vibration period necessary for the continued production of the reducing intermediate R—NH$_2$. Incidentally, in the example shown in FIG. 4, the injection interval is made 3 seconds.

If the vibration period of the hydrocarbon concentration, that is, the feed period of the hydrocarbons HC, is made longer than the above predetermined range of period, the reducing intermediate R—NH$_2$ disappears from the catalyst carrier 50. At this time, the active NO$_2$* which is produced on the platinum Pt 51, as shown in FIG. 7, is stored in the exhaust purification catalyst 13 in the form of NO$_3$. However, if, in this way, the reducing intermediate R—NH$_2$ disappears from the catalyst carrier 50 and the active NO$_2$* is stored in the form of NO$_x$ inside the exhaust purification catalyst 13, the NO$_x$ purification rate falls. In this case, to obtain a good NO$_x$ purification rate, the vibration period of the hydrocarbon concentration has to be made within the above predetermined range.

Therefore, in the present invention, an exhaust purification catalyst 13 for reacting NO$_x$ contained in exhaust gas and reformed hydrocarbons is arranged inside of an engine exhaust passage, a carrier 50 of the exhaust purification catalyst 13 is formed from a crystallized composite oxide of aluminum and an alkali earth metal and precious metal catalysts 51 and 52 are carried on this carrier 50, the exhaust purification catalyst 13 has the property of reducing the NO$_x$ which is contained in exhaust gas if the concentration of hydrocarbons flowing into the exhaust purification catalyst 13 is made to vibrate within a predetermined range of amplitude and within a predetermined range of period and has the property of being increased in storage amount of NO$_x$ which is contained in exhaust gas if the vibration period of the hydrocarbon concentration is made longer than the predetermined range, and, at the time of engine operation, the concentration of hydrocarbons flowing into the exhaust purification catalyst 13 is made to vibrate within the predetermined range of amplitude and within the predetermined range of period to thereby reduce NO$_x$ which is contained in the exhaust gas in the exhaust purification catalyst 13.

Now, in the present invention, the barium Ba inside the catalyst carrier 50 is crystallized, so even if NO$_x$ is stored in the catalyst carrier 50, the NO$_x$ does not react with the barium Ba whereby nitrates are not formed. If NO$_x$ becomes nitrates, NO$_x$ is strongly held inside the catalyst carrier 50, but in the present invention the NO$_x$ does not become nitrates, so the force holding the NO$_x$ is weak. Further, as explained before, the catalyst carrier 50 is weak in basicity, so in the end the force holding the NO$_x$ becomes weak. Therefore, the NO$_x$ which is stored in the exhaust purification catalyst 13 is immediately reduced if hydrocarbons are fed. Therefore, the NO$_x$ does not continue to be stored in the exhaust purification catalyst 13 over a long period of time.

On the other hand, exhaust gas also contains SO$_x$. This SO$_x$ is also adsorbed or held on the catalyst carrier 50. Barium Ba is crystallized, so this SO$_x$ also does not become a sulfate. Further, the catalyst carrier 50 is also weak in basicity, so the force holding the SO$_x$ also becomes weak. In actuality, if raising the temperature of the exhaust purification catalyst 13, even if the temperature of the exhaust purification catalyst 13 is not that high, it is possible to make the exhaust purification catalyst 13 release the SO$_x$. That is, if using this exhaust purification catalyst 13, it is possible to easily restore sulfur poisoning.

That is, the NO$_x$ purification method which is shown from FIG. 4 to FIGS. 6A and 6B can be said to be a new NO$_x$ purification method designed to remove NO$_x$ without forming almost any nitrates and sulfates in the case of using an exhaust purification catalyst which carries precious metal catalysts 51 and 52 on a catalyst carrier 50 which has basicity.

Next, referring to FIG. 8 to FIG. 13, this new NO purification method will be explained in a bit more detail.

Figure 8:
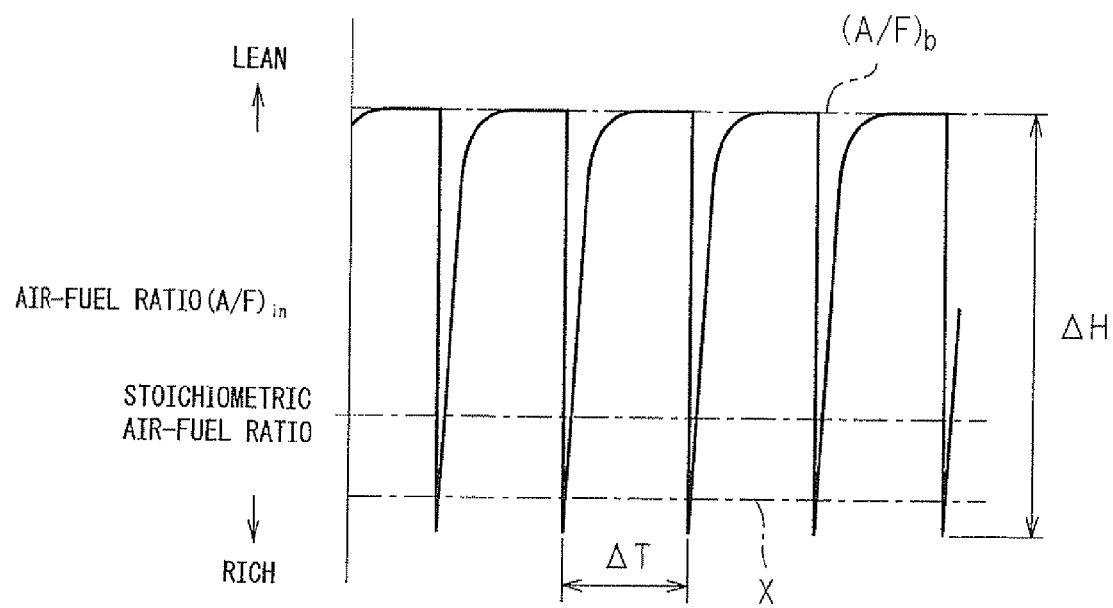
FIG. 8 is a time chart showing a change in an air-fuel ratio of exhaust gas flowing to an exhaust purification catalyst.

FIG. 8 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 8, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 8, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 8, X shows the upper limit of the air-fuel ratio (A/F)in which is used for producing the reducing intermediate without the produced active NO$_2$* being stored in the form of NO$_3$ inside the exhaust purification catalyst 13. To make the active NO$_2$* and the reformed hydrocarbons react and produce the reducing intermediate, it is necessary to make the air-fuel ratio (A/F)in lower than the upper limit X of this air-fuel ratio.

In other words, in FIG. 8, X shows the lower limit of the concentration of hydrocarbons required for making the active NO$_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active NO$_2$*, that is, the air-fuel ratio (A/F)in. The upper limit X of the air-fuel ratio required for producing the reducing intermediate will below be called the demanded minimum air-fuel ratio.

In the example shown in FIG. 8, the demanded minimum air-fuel ratio X becomes rich. Therefore, in this case, to produce the reducing intermediate, the air-fuel ratio (A/F)in is instantaneously made the demanded minimum air-fuel ratio X or less, that is, is made rich. As opposed to this, in the example shown in FIG. 9, the demanded minimum air-fuel ratio X becomes lean. In this case, the reducing intermediate is produced by maintaining the air-fuel ratio (A/F)in lean and periodically making the air-fuel ratio (A/F)in fall.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 9:
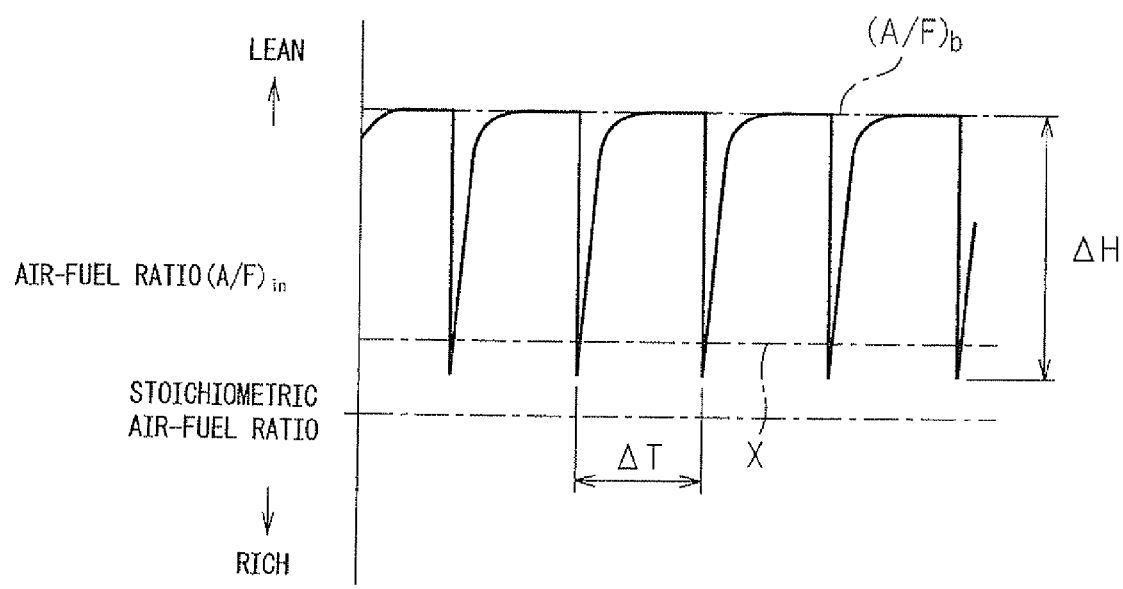
FIG. 9 is a time chart showing a change in an air-fuel ratio of exhaust gas flowing to an exhaust purification catalyst.

Now, if using an exhaust purification catalyst 13 with a strong oxidizing strength, as shown in FIG. 9, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 8, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 9, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 8, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 10:
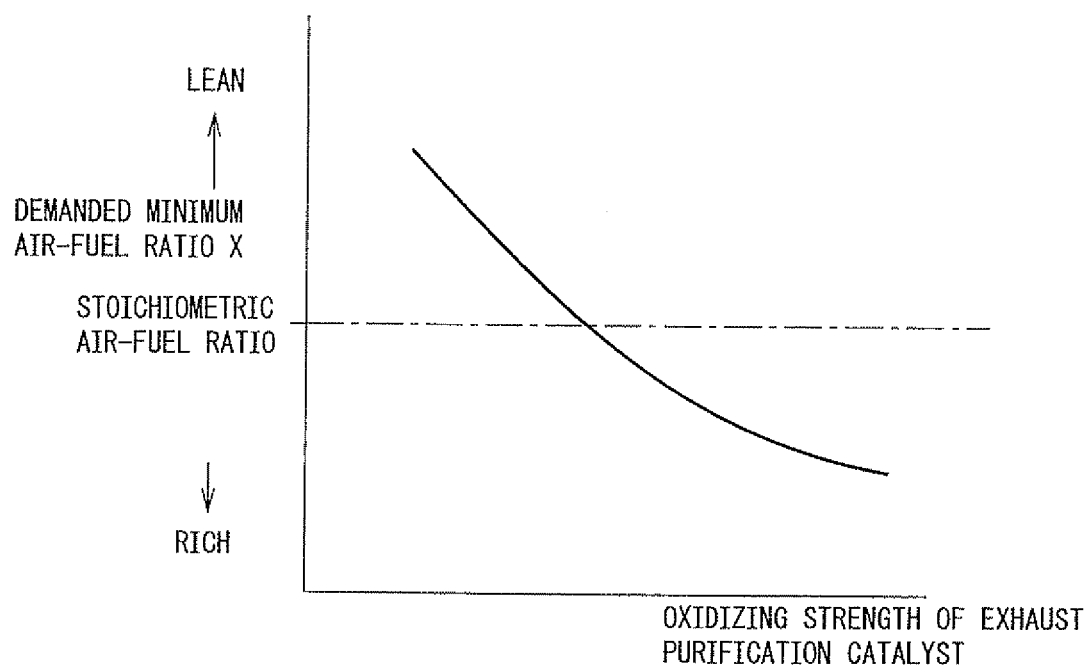
FIG. 10 is a view showing a relationship between an oxidizing strength of an exhaust purification catalyst and a demanded minimum air-fuel ratio X.

That is, it is learned that the demanded minimum air-fuel ratio X, as shown in FIG. 10, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the NO well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 11:
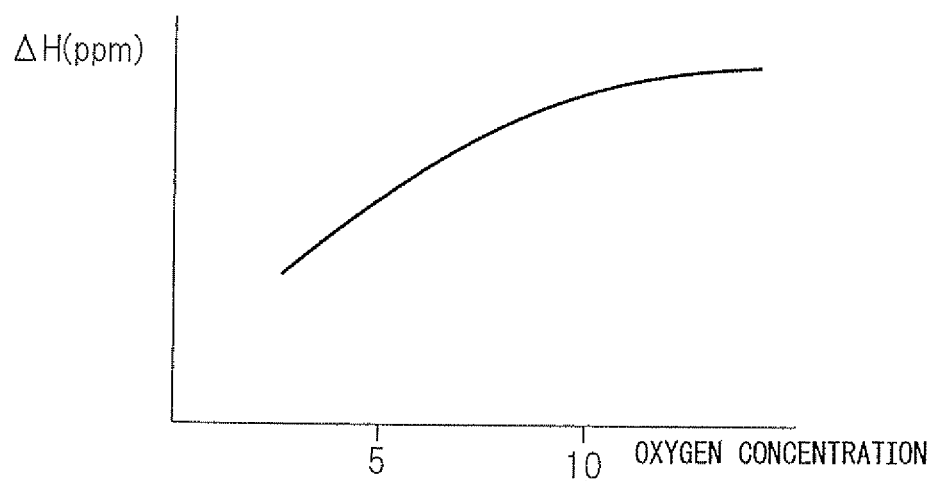
FIG. 11 is a view showing a relationship between an oxygen concentration in the exhaust gas and an amplitude ΔH of a hydrocarbon concentration giving the same $NO_x$ purification rate.

FIG. 11 shows the relationship between the oxygen concentration in the exhaust gas before the hydrocarbons are fed and the amplitude $\Delta H$ of the hydrocarbon concentration when the same $NO_x$ purification rate is obtained. From FIG. 11, it is learned that, to obtain the same $NO_x$ purification rate, the higher the oxygen concentration in the exhaust gas before the hydrocarbons are fed, the greater the amplitude $\Delta H$ of the hydrocarbon concentration has to be made. That is, to obtain the same NO purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 12:
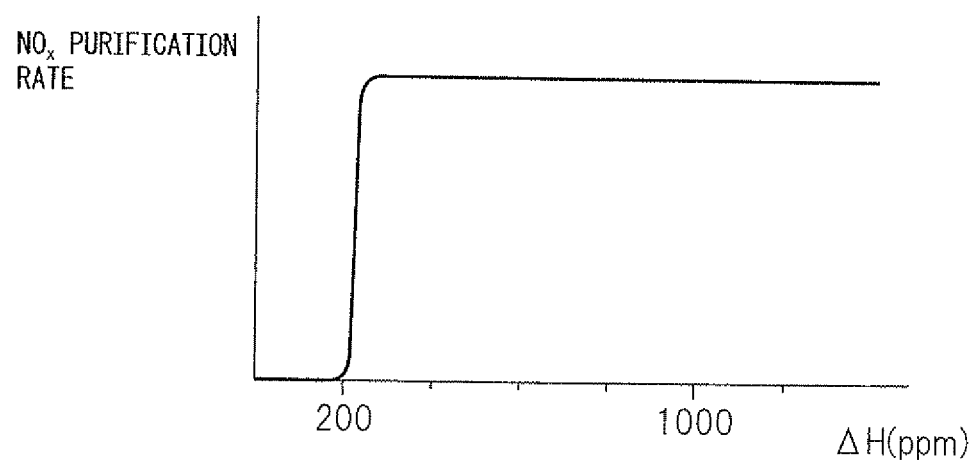
FIG. 12 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is usually larger than at the time of an acceleration operation. Therefore, as shown in FIG. 12, if the amplitude $\Delta H$ of the hydrocarbon concentration is 200 ppm or more, it is possible to obtain a good $NO_x$ purification rate.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 13:
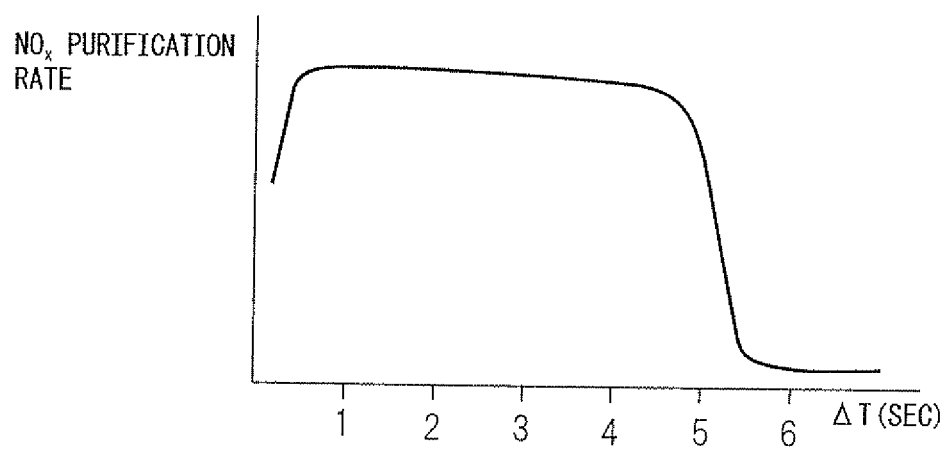
FIG. 13 is a view showing a relationship between a vibration period ΔT of a hydrocarbon concentration and an $NO_x$ purification rate.

Further, if the vibration period $\Delta T$ of the hydrocarbon concentration becomes longer, the oxygen concentration around the active $NO_2^*$ becomes higher in the time after the hydrocarbons are fed to when the hydrocarbons are next fed. In this case, if the vibration period $\Delta T$ of the hydrocarbon concentration becomes longer than 5 seconds or so, the active $NO_2^*$ starts to be stored in the form of $NO_3$ inside of the exhaust purification catalyst 13. Therefore, as shown in FIG. 13, if the vibration period $\Delta T$ of the hydrocarbon concentration becomes longer than 5 seconds or so, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust purification catalyst 13. Therefore, as shown in FIG. 13, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 14:
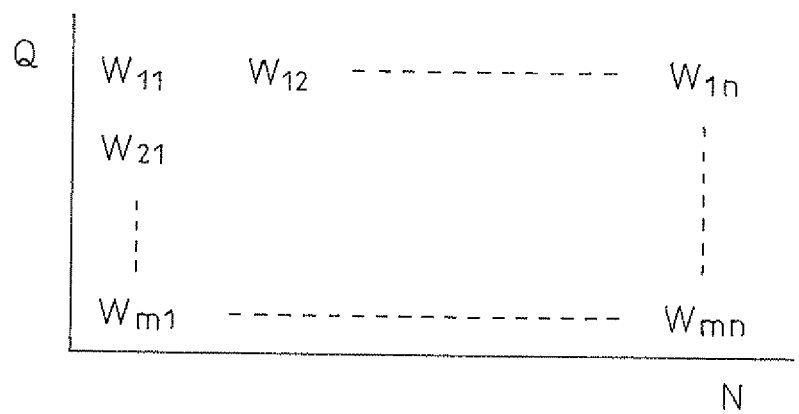
FIG. 14 is a view showing a map of the hydrocarbon feed amount W.

Now, in the present invention, by changing the hydrocarbon feed amount and injection timing from the hydrocarbon feed valve 15, the amplitude $\Delta H$ and vibration period $\Delta T$ of the hydrocarbons concentration are controlled so as to become the optimum values in accordance with the engine operating state. In this case, in this embodiment of the present invention, the hydrocarbon feed amount W able to give the optimum amplitude $\Delta H$ of the hydrocarbon concentration is stored as a function of the injection amount Q from the fuel injector 3 and engine speed N in the form of a map such as shown in FIG. 14 in advance in the ROM 32. Further, the optimum vibration amplitude $\Delta T$ of the hydrocarbon concentration, that is, the injection period $\Delta T$ of the hydrocarbons is similarly stored as a function of the injection amount Q and engine speed N in the form of a map in advance in the ROM 32.

Next, referring to FIGS. 15A and 15B and FIGS. 16A and 16B, another embodiment will be explained.

Figure 15A:
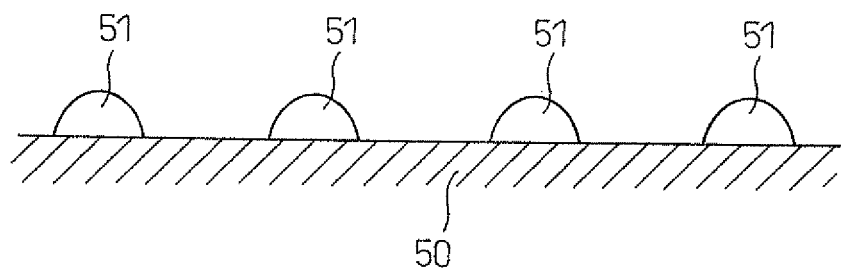
FIGS. 15A and 15B are views schematically showing the surface part of a catalyst carrier.

The substrate of the exhaust purification catalyst 13 is, for example, comprised of cordierite. In this embodiment, on the surface of the cordierite, a coat layer comprised of a mixture of a powder-shaped first catalyst and a powder-shaped second catalyst is formed. FIG. 15A schematically shows a surface part of the catalyst carrier of this first catalyst, while FIG. 15B schematically shows a surface part of the catalyst carrier of this second catalyst.

The catalyst carrier 50 of the first catalyst shown in FIG. 15A is formed from a crystallized composite oxide of aluminum and an alkali earth metal. On this catalyst carrier 50, platinum Pt 51 is carried. In this embodiment as well, the composite oxide which forms this catalyst carrier 50 is barium aluminate $BaAl_2O_4$.

Figure 15B:
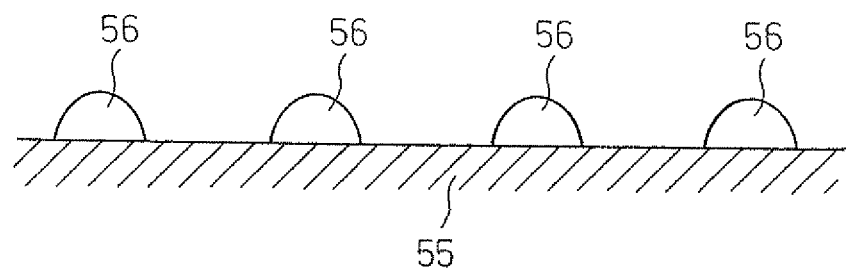

On the other hand, the catalyst carrier 55 of the second catalyst shown in FIG. 15B is comprised of zirconia $ZrO_2$. On this catalyst carrier 55, rhodium Rh 56 is carried. That is, in this embodiment, the second catalyst is formed so that the catalyst carrier 55 does not have basicity.

Figure 16A:
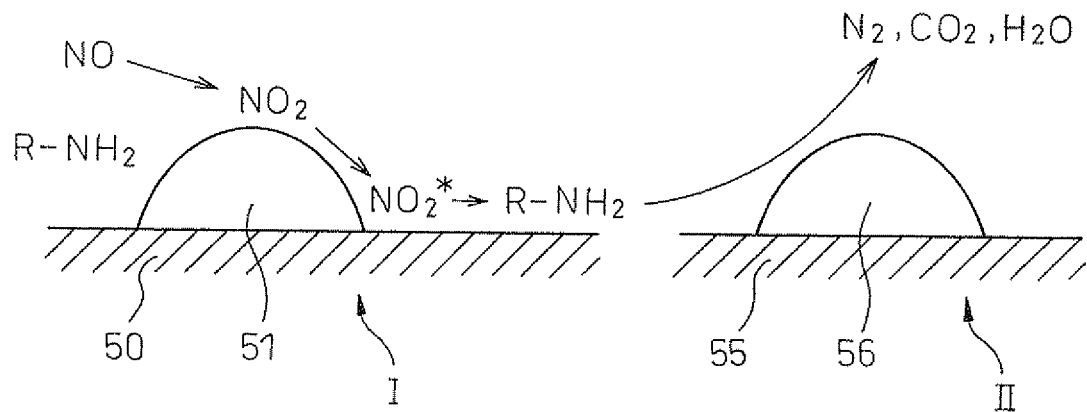
FIGS. 16A and 16B are views for explaining an oxidation reduction reaction in an exhaust purification catalyst.

Next, referring to FIGS. 16A and 16B, the reactions which are believed to be performed at the first catalyst I and second catalyst II will be explained.

If hydrocarbons are fed from the hydrocarbon feed valve 15, the hydrocarbons are reformed at the first catalyst I and become radicalized. As a result, as shown in FIG. 16B, the hydrocarbon concentration around the active $NO_2^*$ becomes higher. On the other hand, at this time, on the rhodium Rh 56 of the second catalyst II, as shown in FIG. 16B, hydrogen $H_2$ is produced from the carbon monoxide CO and moisture $H_2O$ which are contained in the exhaust gas.

Figure 16B:
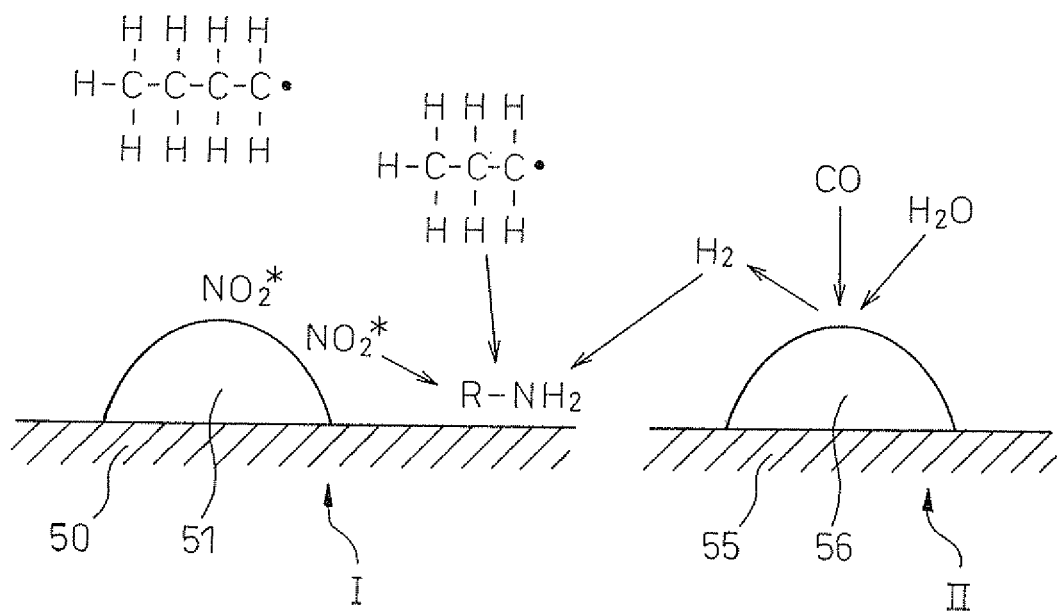

If the concentration of hydrocarbons around the active $NO_2^*$, rises in this way, as shown in FIG. 16B, the active $NO_2^*$ reacts on the platinum Pt 51 with the radical hydrocarbons HC and the hydrogen $H_2$ produced on the rhodium Rh 56 of the second catalyst II whereby the reducing intermediate R—$NH_2$ is produced. This reducing intermediate R—$NH_2$ sticks to or is adsorbed on the surface of the catalyst carrier 50. Next, the concentration of hydrocarbons flowing into the exhaust purification catalyst 13 is lowered whereby if the oxygen concentration becomes higher, the hydrocarbons around the reducing intermediate will be oxidized. As a result, as shown in FIG. 16A, the active $NO_2^*$ reacts with the reducing intermediate R—$NH_2$ to form $N_2$, $CO_2$, and $H_2O$.

In this embodiment as well, production of the reducing intermediate R—$NH_2$ requires hydrogen $H_2$. This hydrogen $H_2$, as shown in FIG. 16B, is produced by the rhodium Rh 56 from the CO and $H_2O$ which are contained in the exhaust gas. In this case, if the catalyst carrier 55 becomes stronger in basicity, the rhodium Rh 56 falls in reducing ability. As a result, hydrogen $H_2$ can no longer be produced well, therefore the reducing intermediate can no longer be produced well. Therefore, in this embodiment, to prevent the reducing ability of rhodium Rh 56 from being lowered, the catalyst carrier 55 is formed from zirconia $ZO_2$ not exhibiting basicity.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
an engine exhaust passage;
an exhaust purification catalyst for reacting $NO_x$ contained in exhaust gas and reformed hydrocarbons arranged inside of the engine exhaust passage;
a carrier of the exhaust purification catalyst, wherein the carrier formed from a crystallized composite oxide of aluminum and an alkali earth metal;
a precious metal catalyst carried on the carrier; and
an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
when the electronic control unit controls the vibration of the concentration of hydrocarbons flowing into the exhaust purification catalyst within the predetermined range of amplitude and within the predetermined range of period, the exhaust purification catalyst has a property of chemically reducing the $NO_x$ that is contained in exhaust gas without storing, or storing a fine amount of nitrates in the exhaust purification catalyst, and
when the electronic control unit controls the vibration period of the hydrocarbon concentration longer than the predetermined range period, the exhaust purification catalyst has a property of being increased in storage amount of $NO_x$ that is contained in exhaust gas.

2. The exhaust purification system of an internal combustion engine as claimed in claim 1, wherein the composite oxide is comprised of barium aluminate ($BaAl_2O_4$).

3. The exhaust purification system of an internal combustion engine as claimed in claim 1, wherein the precious metal is comprised of at least platinum (Pt) and rhodium (Rh).

4. The exhaust purification system of an internal combustion engine as claimed in claim 1, wherein the exhaust purification catalyst is comprised of a mixture of a first catalyst in which platinum (Pt) is carried on the carrier made of the composite oxide and a second catalyst in which rhodium (Rh) is carried on zirconia.

5. The exhaust purification system of an internal combustion engine as claimed in claim 4, wherein the composite oxide is comprised of barium aluminate ($BaAl_2O_4$).

6. The exhaust purification system of an internal combustion engine as claimed in claim 1, wherein inside the exhaust purification catalyst, $NO_x$ contained in exhaust gas and reformed hydrocarbons react to produce a reducing intermediate containing nitrogen and hydrocarbons and wherein the vibration period of the hydrocarbon concentration is a vibration period required for continued production of the reducing intermediate.

7. The exhaust purification system of an internal combustion engine as claimed in claim 6, wherein the vibration period of the hydrocarbon concentration is 0.3 second to 5 second.

* * * * *